(12) United States Patent
Rojey et al.

(10) Patent No.: US 8,431,013 B2
(45) Date of Patent: Apr. 30, 2013

(54) PROCESS AND FACILITY FOR TREATMENT OF CRUDE OIL WITH ASPHALTENIC RESIDUE CONVERSION

(75) Inventors: Alexandre Rojey, Rueil-Malmaison (FR); Eric Lenglet, Rueil-Malmaison (FR)

(73) Assignee: IFP, Rueil-Malmaison Cedex (FR)

( * ) Notice: Subject to any disclaimer, the term of this patent is extended or adjusted under 35 U.S.C. 154(b) by 544 days.

(21) Appl. No.: 12/376,522

(22) PCT Filed: Jul. 6, 2007

(86) PCT No.: PCT/FR2007/001168
§ 371 (c)(1),
(2), (4) Date: Aug. 3, 2010

(87) PCT Pub. No.: WO2008/017742
PCT Pub. Date: Feb. 14, 2008

(65) Prior Publication Data
US 2010/0282640 A1 Nov. 11, 2010

(30) Foreign Application Priority Data
Aug. 8, 2006 (FR) ..................................... 06 07273

(51) Int. Cl.
*C10G 67/02* (2006.01)
*C10G 69/02* (2006.01)
(52) U.S. Cl.
USPC ................... 208/49; 208/86; 208/87; 208/93; 208/950
(58) Field of Classification Search .................... 208/49, 208/86, 87, 92–94, 950
See application file for complete search history.

(56) References Cited

U.S. PATENT DOCUMENTS

| 4,367,077 | A | 1/1983 | Tao |
| 6,054,496 | A * | 4/2000 | Crane et al. .................... 518/702 |
| 6,241,874 | B1 * | 6/2001 | Wallace et al. .................. 208/45 |

(Continued)

FOREIGN PATENT DOCUMENTS

| AU | 436 117 B2 | 5/1973 |
| EP | 1 219 566 A | 7/2002 |

(Continued)

OTHER PUBLICATIONS

Yang, W-C. (1998). Fluidization, Solids Handling, and Processing—Industrial Applications.. William Andrew Publishing/Noyes. p. 619-621.*
International Search Report, PCT/FR2007/001168, Dec. 3, 2007, 3 pages, Patricia Deurinck, Dec. 13, 2007.

*Primary Examiner* — Walter D Griffin
*Assistant Examiner* — Renee E Robinson
(74) *Attorney, Agent, or Firm* — Millen, White, Zelano & Branigan, P.C.

(57) ABSTRACT

A process for refining or pre-refining a crude oil P is described in which P is fractionated into several fractions, wherein partial oxidation of an asphaltenic residue R1 derived from P is carried out to produce a synthesis gas SG1 with an $H_2/CO$ ratio of less than 1, steam cracking is carried out of an external light hydrocarbon fraction to produce a synthesis gas SG2 with a $H_2/CO$ ratio of more than 3; SG1 and SG2 are mixed to produce a synthesis gas SG with a $H_2/CO$ ratio in the range 1.2 to 2.5, and SG is converted by Fischer-Tropsch synthesis, then the waxes produced are converted into middle distillates. Preferably, a vacuum distillate VGO and/or a deasphalted oil DAO derived from P are hydrocracked mixed with the waxes. The invention also pertains to a facility for carrying out the process.

3 Claims, 1 Drawing Sheet

U.S. PATENT DOCUMENTS

| | | |
|---|---|---|
| 6,277,894 B1 | 8/2001 | Agee et al. |
| 6,306,917 B1 | 10/2001 | Bohn et al. |
| 7,041,211 B2 * | 5/2006 | Kalnes .......................... 208/89 |
| 2004/0055217 A1 | 3/2004 | Gauthier et al. |
| 2004/0181313 A1 | 9/2004 | Mohedas |

FOREIGN PATENT DOCUMENTS

| | | |
|---|---|---|
| WO | WO 9913024 A | 3/1999 |
| WO | WO 99/55618 | 11/1999 |
| WO | WO 00/06670 A | 2/2000 |

* cited by examiner

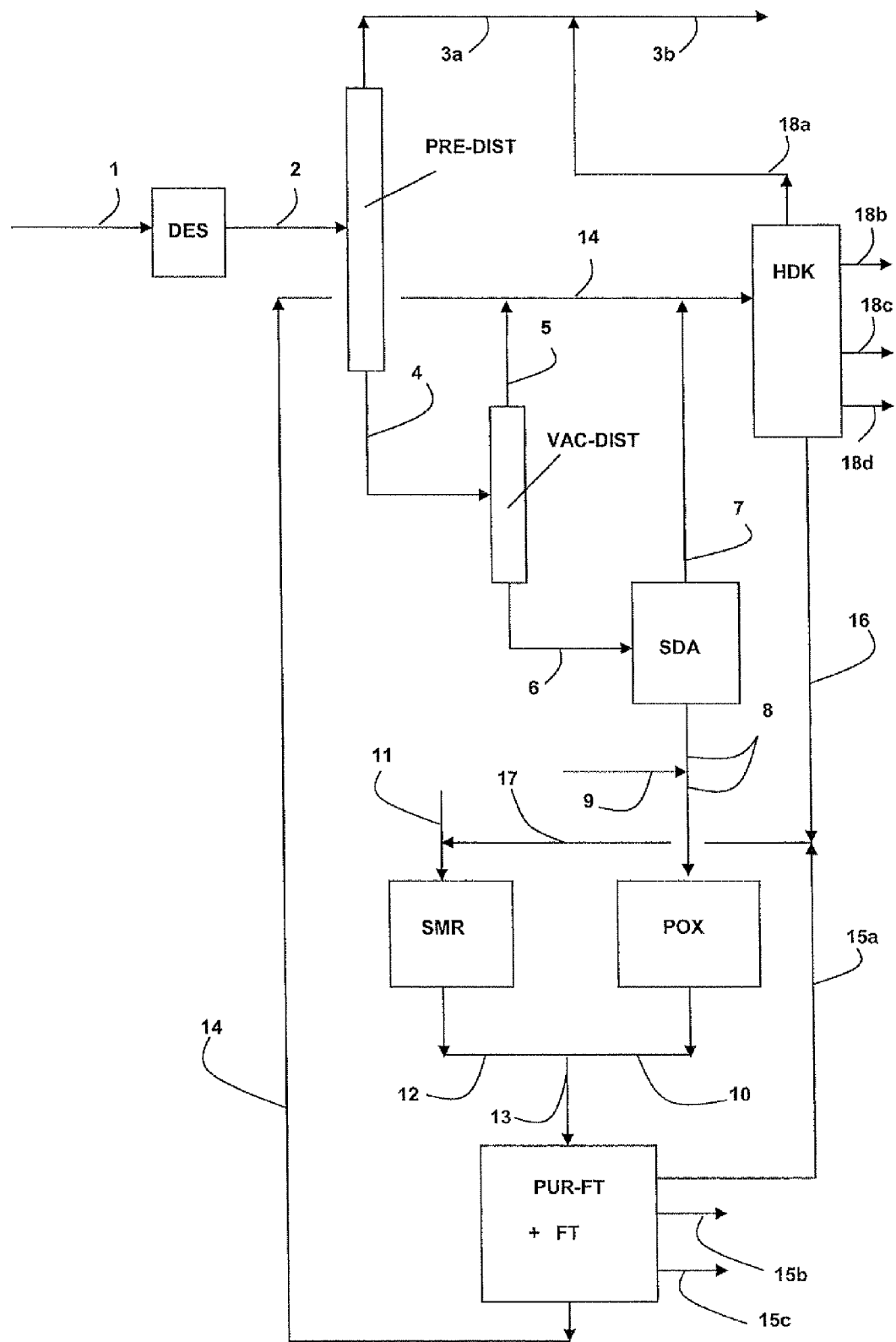

PROCESS AND FACILITY FOR TREATMENT OF CRUDE OIL WITH ASPHALTENIC RESIDUE CONVERSION

FIELD OF THE INVENTION

The present invention relates to the oil industry, in particular the oil processing industry, typically in the oil and also the gas production region, to produce either a set of refined products or one or more oils, termed synthetic oils, of improved quality. It is also possible to carry out co-production of refined product(s) and synthetic oil(s).

The invention relates to a process and facility for reducing or removing asphaltenes, the heaviest products of oil, which have few industrial uses and mediocre value.

The principal commercial end products which may be obtained in a facility of the invention are:
  firstly, one or more conventional refined products including: petrochemical naphtha, gasoline, kerosene, gas oil (also known as diesel), domestic fuel, liquefied petroleum gas, and occasionally other products: lubricating oils, solvents, paraffin, gas turbine fuel, etc;
  secondly, and optionally, one or more synthetic oils typically with a reduced or zero asphaltenes content.

PRIOR ART

In application number FR-A-04/02088, the Applicant proposed using a field gas, which is relatively cheap in the oil and gas production region, to pre-refine a conventional oil, and typically produce an oil Pa with a low sulphur content substantially free of asphaltenes, and a residual oil Pb (comprising the starting asphaltenes, partially converted by a hydrogenating treatment). Oil Pa produced provides, after refining, very little or no sulphur-containing fuel and may have a high middle distillates content; market demand for this is constantly increasing. It constitutes a high quality oil. Oil Pb typically comprises lower quality fractions, in particular residual asphaltenes.

The process also envisages optional co-production of commercial oil end products: naphtha, gasoil, etc.

That prior art process thus produces a high quality oil Pa which is in demand in the market. However, there is still a need for further improving the process, in particular to further reduce the quantity of heavy products and residual asphaltenes present in the residual oil Pb. It would also be desirable to reduce the unit costs of the treated products.

SUMMARY OF THE INVENTION

The invention proposes a process and facility for refining or pre-refining crude oil, which is generally conventional, to substantially reduce and preferably remove asphaltenes present in the end products obtained and produce only high quality fractions which are free of asphaltenes.

In a first aspect of the invention, the asphaltenes of a crude oil P are concentrated in a residue R1 which is gasified by partial oxidation to produce a synthesis gas SG1 with a low $H_2/CO$ ratio, typically less than 1. In a second aspect of the invention, a secondary feed G is also used, composed of hydrocarbons containing less than 5 carbon atoms (typically an external feed: natural gas and/or associated gas usually supplemented with recycled C1-C2 hydrocarbons (the term Cn designating one or more hydrocarbons containing n carbon atoms) or C1 to C4 from conversion units for the treatment of an oil P or for the conversion of the synthesis gas obtained) which is converted by steam reforming into a second synthesis gas SG2 with a high $H_2/CO$ ratio typically more than 3. The mixture of SG1 and SG2 is selected so as to obtain a synthesis gas with an intermediate $H_2/CO$ ratio in the range 1.2 to 2.5, which is suitable for Fischer-Tropsch conversion into hydrocarbons which are liquid and/or solid at ambient temperature. The heavy products, in particular the waxes produced (paraffins which are solid at ambient temperature) are then typically at least partially hydrocracked into diesel fuel. Thus, the process can convert the majority or even all of the asphaltenes which are deficient in hydrogen (low H/C ratio) into noble products by adding gas (with a high H/C ratio), typically natural gas and/or external (compared with the oil) associated gas. It advantageously uses a feed of external light hydrocarbons to increase, by generating and adding a second synthesis gas, the $H_2/CO$ ratio of the partial oxidation effluents from the residues, which are typically deficient in hydrogen.

The invention is not linked to a particular Fischer-Tropsch process, neither as regards the technology of the reactor or reactors, nor as regards the catalyst, nor as regards the conditions of the process: in particular, a three-phase fixed bed reactor (trickle bed) may be used, as well as a slurry reactor. Similarly, a Fischer-Tropsch catalyst with cobalt as well as a Fischer-Tropsch catalyst with iron may be used, or any other type of Fischer-Tropsch catalyst. Preferably, the relative quantities of SG1 and SG2 are adapted to produce a synthesis gas SG with a $H_2/CO$ ratio which is suitable for the catalyst used, typically in the range 1.2 to 2 for a catalyst with iron, and usually in the range 1.8 to 2.5 for a cobalt catalyst, although these values are not limiting.

The limited quantities of gas produced, typically C1-C2 hydrocarbons, or C1-C4 hydrocarbons (containing 1-2 or 1-4 carbon atoms) produced during the Fischer-Tropsch step and during hydrocracking may advantageously be recycled to the steam cracking step.

Preferably, only C1/C2 fractions are recycled; petroleum gas (LPG: C3/C4) can readily be liquefied for transport.

From a given crude, then, in accordance with the invention it is possible to transform that crude in its entirety into highly upgradeable liquid products (apart from material losses linked to energy consumption) comprising a synthetic crude free of heavy fuel, or in the same manner into fuels and petrochemicals bases: LPG, naphtha+gasoline+kerosene+gasoil (apart from material losses linked to energy consumption).

In a characteristic variation of the invention, not only waxes but also a mixture of a non-asphaltenic cut from oil P, typically a vacuum distillate VGO and/or a deasphalted oil DAO, is hydrocracked. This means that hydrocracking can be carried out in a single large or very large capacity unit, thus reducing the cost per tonne of treated product. The mixture of paraffin waxes from the Fischer-Tropsch unit, (high purity non sulphur-containing product, non nitrogen-containing product) in the hydrocracked feed can also prolong the cycle period of the hydrocracking unit compared with operation with a VGO and/or DAO feed alone, which generally contain more compounds which are difficult to hydrocrack (in particular polyaromatics) and impurities (in particular nitrogen). The middle distillates fraction: kerosene/gasoil (typically boiling between about 150° C. and about 340° C. or 360° C.) of the Fischer-Tropsch effluents may also be hydrocracked under mild conditions encouraging hydroisomerization, either separately or mixed with heavier Fischer-Tropsch effluents.

DETAILED DESCRIPTION OF THE INVENTION

In its most general form, the invention provides a process for transforming at least one crude oil P, preferably in the oil and gas production region, comprising:

a preliminary treatment of P comprising at least one step for fractionating P by distillation (PRE-DIST) and/or for deasphalting (SDA) to produce at least one asphaltenic residue R1 and at least one first non-asphaltenic stream E1;

a step (PDX) for partial oxidation of the residue R1, optionally supplemented with diluent to produce a first synthesis gas SG1 with a $H_2/CO$ ratio of less than 1;

a step for steam reforming a cut G comprising hydrocarbons containing less than 5 carbon atoms, at least 50% by weight of said hydrocarbons being external to the oil P, to produce a second synthesis gas SG2 with a $H_2/CO$ ratio of more than 3;

mixing at least a portion of SG1 and at least a portion of SG2 in proportions which can produce a synthesis gas SG with a $H_2/CO$ ratio in the range 1.2 to 2.5;

a step for Fischer-Tropsch conversion of SG, generally purified in a preliminary purification step (PUR-FT), to obtain principally liquid fractions and paraffin waxes;

a step (HDK) for hydrocracking at least the major portion of the paraffin waxes to produce at least one cut comprising liquid hydrocarbons boiling below 340° C.

Thus, a residue which is rich in asphaltenes can be transformed into highly upgradeable liquid hydrocarbons.

In a first variation of the invention, at least one pre-refined non-asphaltenic oil Pa is produced from at least a portion of the non-asphaltenic cuts derived from the preliminary treatment of P, optionally after catalytic hydrogenating treatment(s), and from at least a portion of the hydrocracking effluents.

Thus, an oil can be transformed into a synthetic (or pre-refined) oil which is free of low value heavy products.

Preferably, in this first variation of the invention, a heavy cut from P is hydrocracked mixed with waxes. Hence, during the preliminary treatment of P, a non-asphaltenic stream E1 is produced which essentially boils above 340° C., and at least partial hydrocracking (HDK) of at least the major portion of the paraffin waxes mixed with E1 is carried out.

Typically, E1 is essentially constituted by vacuum distillate VGO and/or deasphalted oil DAO from the fractionation of P.

In this first variation of the invention, typically partial hydrocracking of the hydrocracking feed can be carried out, for example with a conversion in the range 25% to 75% by weight, or 30% to 50% by weight of products boiling below 340° C. Deep hydrocracking can also be carried out to produce a conversion between 70% and about 90%, or even 95% and more in certain cases. Hydrocracking may be carried out in a single pass or with recycling.

In a second variation of the invention, only refined products are produced from non-asphaltenic cuts derived from the initial fractionation step or steps (for example atmospheric distillates or vacuum distillates) and from hydrocracking effluents. The operations for obtaining refined products are thus typical refining operations: typically, hydrotreatment of naphthas, kerosene and atmospheric distillation gasoil, catalytic reforming of hydrotreated naphtha, isomerization of light paraffins, optional fluid catalytic cracking of heavy cuts, etc. The process can transform substantially all of the crude P into gasoline, kerosene, gasoil, domestic fuel, optionally with a reduced quantity of fuel generally with a low sulphur content.

In a third variation of the invention, one or more pre-refined non-asphaltene oils and also one or more refined products are produced.

The hydrogen used for hydrocracking may advantageously be produced from a fraction of the steam reforming effluents. It may also derive from a catalytic naphtha reforming unit.

The invention also proposes an oil treatment facility, in particular for carrying out the process described above, comprising:

an initial oil distillation unit, producing at least one distillate and a first residue AR;

at least one unit for secondary fractionation of AR to produce an asphaltenic residue R1 and at least one first non-asphaltenic stream E1;

a unit for partial oxidation (PDX) of the residue R1, optionally supplemented with diluent to produce a first synthesis gas SG1 with a $H_2/CO$ ratio of less than 1;

a steam reforming unit (SMR) connected to an external source G composed principally of hydrocarbons containing less than 5 carbon atoms to produce a second synthesis gas SG1 with a $H_2/CO$ ratio of more than 3;

a zone for mixing at least a portion of SG1 and at least a portion of SG2 connected upstream to a partial oxidation unit (PDX) and to a steam reforming unit (SMR) to obtain a synthesis gas SG with a $H_2/CO$ ratio in the range 1.2 to 2.5;

a unit (FT) for Fischer-Tropsch conversion of SG connected upstream to the mixing zone, generally via a purification unit PUR-FT, to principally obtain liquid fractions and paraffin waxes;

a unit (HDK) for hydrocracking at least the major portion of the paraffin waxes, connected upstream to the Fischer-Tropsch conversion unit (FT) to produce at least one cut comprising liquid hydrocarbons boiling essentially below 340° C.

This facility may also comprise a zone for mixing at least the major portion of the paraffin waxes and the non-asphaltenic stream E1, connected upstream to said secondary fractionation unit and to the Fischer-Tropsch conversion unit (FT), and connected downstream to the hydrocracking unit (HDK), for hydrocracking (HDK) of said at least the major portion of the paraffin waxes mixed with E1.

This allows an increased capacity hydrocracking unit to be operated, thereby reducing the unit cost and allowing increased cycle periods compared with hydrocracking E1 alone.

In one preferred implementation of the invention, the facility comprises a unit (VD) for vacuum distillation of a first residue AR for the production of a vacuum distillate VGO and a vacuum residue VR, a unit (SDA) for deasphalting VR to produce a deasphalted oil DAO and an asphalt stream AS, and a zone for mixing VGO and DAO and waxes from the Fischer-Tropsch conversion unit to obtain the feed for the hydrocracking unit (typically a mixture of VGO/DAO/wax, and optionally Fischer-Tropsch gasoil). Thus, the flow rate of the hydrocracking feed is further increased.

The preliminary treatment of P may essentially comprise a combination in series of initial distillation (atmospheric), vacuum distillation and vacuum residue deasphalting. The preliminary treatment and/or subsequent treatments may also comprise one or more hydrogenating treatments, for example a hydrotreatment HDT or hydroconversion HDC of the vacuum distillate and/or deasphalted oil, a RHDT hydrotreatment or a RHDC hydroconversion of atmospheric residue or vacuum residue or the asphalt, etc.

When the asphalt AS is used to supply the partial oxidation unit, it may be advantageous to add a diluent to form the residue R1, a feed from the partial oxidation unit, in a zone for mixing AS with 4% to 40%, in particular 4% to 30% by weight of diluent, for example 10% to 20% of gasoil or kerosene. Advantageously, desalted oil P may also be used as the diluent.

The invention is linked to a combination of steps and not to the particular conditions (technology, catalysts, operating conditions) of using the various steps. Treatment of the oil P may use one or more hydrogenating catalytic treatments. According to the invention, the term "catalytic hydrogenating treatment" is a treatment comprising at least one of the treatments defined below and symbolized by the following terms: HDT, HDC, HDK (which encompasses M-HDK, MP-HDK and HP-HDK), RHDT, RHDC. A hydrogenating catalytic treatment may thus include several of these treatments, for example HDT+HDC or HDC+HDT, etc.

Thus, the following hydrogenating catalytic treatments can be distinguished:

a) Hydrotreatments (HDT) of Feeds without Asphaltenes

Hydrotreatments of hydrocarbon distillates or deasphalted oil (feeds substantially free of asphaltenes) are processes which are well known in the art. Their principal aim is to at least partially eliminate unwanted compounds, typically sulphur, nitrogen, possibly metals such as iron, nickel or vanadium, etc. They are also often used for the hydrogenation of aromatics, generally simultaneously with desulphurization of the feed.

Conventionally, for those of said feeds which comprise compounds boiling above 371° C., the term "hydrotreatment" is applied to a process wherein conversion of these compounds into compounds with a boiling point of less than 371° C. is 20% by weight or less. For processes treating the same feeds, but with a conversion of more than 20% by weight, the term used is hydroconversion (HDC), or hydrocracking (HDK), these processes being presented below.

Hydrotreatment processes function under hydrogen pressure and use solid supported catalysts, typically granular solids or extrudates with a characteristic dimension (diameter for beads or equivalent diameter (corresponding to the same cross section) for extrudates) in the range 0.4 to 5 mm, in particular in the range 1 to 3 mm. The operating conditions, in particular the hourly space velocity (HSV) and the mole ratio of hydrogen to hydrocarbon ($H_2/HC$) varies depending on the cuts being treated, the impurities present and the desired final specifications.

Typical and non-limiting examples of the operating conditions are given in the table below:

Certain of these catalytic formulae are occasionally doped with phosphorus. Other oxide supports are used such as mixed silica-alumina type or titanium-alumina type supports.

Said supports are typically of low acidity to obtain acceptable catalytic cycle times.

Examples of hydrotreatment catalysts, in particular for diesel, gasoil or vacuum gasoil cuts, are the catalysts HR448 and HR426 sold by AXENS, France.

When traces of metals, in particular nickel and vanadium, are present in the feed, a catalytic support having a porosity which is suitable for depositing these metals is advantageously employed.

One example of such a catalyst is HMC841 sold by AXENS.

For the hydrotreatment of a deasphalted oil (DAO) comprising metals, for example, a first bed with an HMC841 catalyst may be used for demetallization, then a second bed of HR448 for desulphurization and denitrogenation.

Other technical elements relating to hydrotreatment may be found in the reference text "Conversion processes", P Leprince, Editions Technip, Paris $15^{th}$, pages 533-574.

b) Process for Hydrocracking (HDK) Asphaltene-Free Feeds

Hydrocracking processes are also processes which are well known in the art. They apply exclusively to feeds which are substantially free of asphaltenes or metals such as nickel or vanadium.

The hydrocracking feed is typically composed of vacuum gasoil, occasionally supplemented with gasoil and/or deasphalted oil (deasphalted vacuum residue, typically deasphalted by a solvent from the group formed by propane, butane, pentane and mixtures thereof, preferably propane and butane).

It is also possible to carry out hydrocracking of deasphalted oil, DAO. The DAO must then have sufficient quality: typically, a hydrocracking feed comprises less than 400 ppm (parts per million, by weight) of asphaltenes, preferably less than 200 ppm and more preferably less than 100 ppm. The metal content (typically nickel+vanadium) of a hydrocracking feed is typically less than 10 ppm, preferably less than 5 ppm, and more preferably less than 3 ppm.

| Oil cut | Cut point (° C.) | hourly space velocity ($h^{-1}$) | $H_2$ pressure (bar) | Cycle start temperature (° C.) | $H_2/HC$ ratio ($Nm^3/m^3$) | $H_2$ consumed (wt %) |
|---|---|---|---|---|---|---|
| Naphtha | 70-180 | 4-10 | 5-10 | 260-300 | 100 | 0.05-0.01 |
| Kerosene | 160-240 | 2-4 | 15-30 | 300-340 | 150 | 0.01-0.02 |
| Diesel and gasoil | 230-371 | 1-3 | 20-40 | 320-350 | 150-300 | 0.3-0.8 |
| Vacuum gasoil | 371-565 | 1-2 | 40-70 | 360-380 | 300-500 | 0.4-0.9 |
| Deasphalted oil | >565 | 0.5-1.5 | 50-110 | 360-380 | 500-1000 | 0.5-1 |

Hydrotreatment catalysts typically comprise a metal or compound of a metal from group VIB and a metal or compound of a metal from group VIII on a support.

The most common catalysts are composed of an oxide support and an active phase in the form of molybdenum sulphide or tungsten sulphide promoted by cobalt or nickel. The most commonly used formulae are CoMo, NiMo and NiW associations for the active phase, and high specific surface area γ alumina for the support. The metal contents are usually of the order of 9% to 15% by weight of molybdenum and 2.5% to 5% by weight of cobalt or nickel.

Conventionally, a feed is considered to be substantially asphaltene-free if its asphaltenes content is below 400 ppm. (For a pre-refined oil, in like manner, it is considered to be amino acid-free or non-asphaltenic if the fraction boiling above 524° C. contains less than 400 ppm of asphaltenes).

Typically, the hydrocracking feed is initially pre-refined on a hydrotreatment catalyst, typically different from the hydrocracking catalyst. This catalyst, typically with an acidity which is lower than that of the hydrocracking catalyst, is selected to substantially eliminate the metals, reduce traces of asphaltenes, and reduce organic nitrogen, which inhibits hydrocracking reactions to a value which is typically less than 100 ppm, preferably less than 50 ppm and more preferably less than 20 ppm.

Hydrocracking catalysts are typically bifunctional catalysts having a double function: acid, and also hydrogenating/dehydrogenating.

Typically, the acidity of the support is relatively high so that the ratio of the hydrogenating activity to the isomerizing activity, H/A, as defined in French patent FR-A-2 805 276, pages 1 line 24 to 3 line 5, is more than 8, preferably more than 10 or more preferably more than 12 or even more than 15. Typically, hydrotreatment is carried out upstream of the reactor or the hydrocracking zone with a hydrotreatment catalyst with a H/A ratio (as cited above) of less than 8, in particular less than 7.

Hydrocracking catalysts typically comprise at least one metal or metal compound from group VIB (such as Mo, W) and a metal or metal compound from group VIII (such as Ni, etc) deposited on a support. The atomic ratio of the group VIII metal ($M_{VIII}$) to the sum of the metals from groups VIII and VIB, i.e. the atomic ratio $M_{VIII}/(M_{VIII}+M_{VIB})$, in particular for the couples NiMo and NiW, is usually close to 0.25, for example in the range 0.22 to 0.28.

The metals content is usually in the range 10% to 30% by weight. The group VIII metal may also be a noble metal such as palladium or platinum, in amounts of the order of 0.5% to 1% by weight.

The acid support may comprise an alumina doped with a halogen, or a silica-alumina with sufficient acidity, or a zeolite, for example a Y zeolite or dealuminized USY zeolite, usually with a double pore distribution with a double pore network comprising micropores with a dimension principally in the range 4 to 10 Å and mesopores with a dimension principally in the range 60 to 500 Å. The silica/alumina ratio of the zeolite structure is usually in the range 6.5 to 12.

By way of example, a concatenation of hydrotreatment then hydrocracking may be used with catalyst HR448 (HDT) then HYC642 (HDK) sold by AXENS. If the feed includes metals, a bed of demetallization catalyst may be used upstream of these two catalytic beds, such as catalyst HMC841 also sold by AXENS.

Typical examples of operating conditions for hydrocracking are as follows:
space velocity HSV in the range 0.3 to 2 $h^{-1}$;
temperature in the range 360° C. to 440° C.;
hydrogen recycle between 400 and 2000 $Nm^3$ per $m^3$ of feed;
the partial pressure of hydrogen and the total pressure may vary substantially depending on the feed and the desired conversion. By convention, a conversion of 20% by weight or more and less than 42% by weight corresponds to mild hydrocracking (M-HDK); a conversion of 42% by weight or more and below 60% by weight corresponds to medium pressure hydrocracking (MP-HDK) and a conversion of 60% by weight or more (typically less than 95% by weight) corresponds to high pressure hydrocracking (HP-HDK).

By definition, the conversion is that of the products with a boiling point of 371° C. or more, to products boiling below 371° C.

Typically, depending on the feeds, the partial pressure of hydrogen is usually in the range about 2 MPa to 6 MPa for mild hydrocracking, between about 5 MPa and 10 MPa for medium pressure hydrocracking and between about 9 MPa and 17 MPa for high pressure hydrocracking. The total pressure is usually in the range 2.6 to 8 MPa for mild hydrocracking, between about 7 and 12 MPa for medium pressure hydrocracking and between 12 and 20 MPa for high pressure hydrocracking.

Hydrocracking processes are typically operated as a fixed bed with granular solids or extrudates with a characteristic dimension (diameter for beads or equivalent diameter (corresponding to the same cross section) for extrudates) in the range 0.4 to 5 mm, in particular in the range 1 to 3 mm. The scope of the invention also encompasses hydrocracking carried out in a moving bed (granular bed of catalyst typically in the form of extrudates or, as is preferable, in the form of beads with dimensions similar to those described for a fixed bed).

Other technical elements relating to hydrocracking can be found in general reference work A "Hydrocracking science and technology", J Scherzer and A J Gruia, Ed: Marcel Dekker New York, and in general reference work B: "Conversion processes", P Leprince, 2001, Editions Technip, Paris $15^{th}$, pages 334-364.

c) Process for Hydroconversion (HDC) of an Asphaltene-free Feed (for Example of the DAO Type) but Comprising Large Quantities of Metals (Ni, V):

Such processes can produce conversions (with the same definition as for hydrocracking) of more than 20% by weight and often much higher (for example 20% to 50%, or 50% to 85% by weight, for example in ebullated beds). These processes may use varying partial pressures of hydrogen, for example 4 to 12 MPa, temperatures between 380° C. and 450° C., and a hydrogen recycle in the range 300 to 1000 $Nm^3$ per $m^3$ of feed.

The catalysts used are similar or near in type to that of residue hydrocracking or hydroconversion catalysts, defined below, and have a porosity allowing a substantial demetallization capacity.

As an example, a HTS358 type catalyst may be used, as sold by AXENS.

d) Residue Hydrotreatments (RHDT) or Residue Hydroconversions (RHDC):

Residue hydrotreatment processes (and residue hydroconversion processes) are well known in the art.

Typical operating conditions for such processes are as follows: hourly space velocity (HSV) in the range 0.1 to 0.5; partial pressure of $H_2$ between 1 and 1.7 MPa. Hydrogen recycle between 600 and 1600 $Nm^3$ per $m^3$ of feed; temperature between 340° C. and 450° C.

The catalysts for the fixed, moving or ebullated bed processes are usually supported macroscopic solids, for example beads or extrudates with a mean diameter in the range 0.4 to 5 millimeters. Typically, they are supported catalysts comprising a metal or compound of a metal from group VIB (Co, Mo, W) and a metal or compound of a metal from group VIII (Fe, Co, Ni, etc) on a mineral support, for example catalysts based on cobalt and molybdenum on alumina, or nickel and molybdenum on alumina.

For fixed bed hydrotreatment or hydroconversion, for example, a HMC841 hydrodemetallization catalyst may be used, then hydroconversion and hydrocracking catalysts: HT318 then HT328 from AXENS.

For an ebullated bed, a HOC458 type catalyst may be used, also sold by AXENS.

Slurry process catalysts are more diversified and may include particles of coal or ground lignite impregnated with iron sulphate or other metals, or used ground hydrotreatment catalyst, particles of molybdenum sulphide associated with a hydrocarbon matrix, obtained by in situ decomposition of precursors such as molybdenum naphthenate, etc. The particle dimensions are typically below 100 micrometers, or even lower again.

Other characteristics of the processes and residue hydroconversion catalysts are given in general reference work C "Raffinage et conversion des produits lourds du pérole" ["Refining and conversion of heavy oil products"], J F Le Page, S G Chatila, M Davidson, Technip, Paris, 1990) in chapter 4 (conversion catalytique sous pression d'hydrogène [catalytic conversion under hydrogen]) and chapter 3 paragraph 3.2.3. Reference may also be made to the general work with reference B cited above, pages 411-450, in chapter 13 (hydroconversion des résidus [residue hydroconversion]), and to the general work with reference D: "Upgrading petroleum residues and heavy oils", by Murray R Gray, Marcel Dekker, publishers, New York, chapter 5.

Hydrogen production when using these hydrogenating catalytic treatments may be achieved from purified gas, for example by steam reforming over a nickel catalyst, then shift conversion, then purification. This is a well known process described in general reference work B cited above, P 451-502.

The process of the invention may also produce the hydrogen necessary for the various uses (hydrotreatment, hydrocracking, etc) from a fraction of the synthesis gas SG2.

When the process of the invention is carried out on or near an oil production site (for example less than 100 km away) The separated $CO_2$ may be re-injected into the oil field for assisted recovery with $CO_2$ ($CO_2$ flooding) and/or sequestration of $CO_2$ in depleted wells (at the end of production).

The process of the invention may optionally also comprise refining steps to produce refined products. Reference can in particular be made to reference work B cited above for a description of unitary isomerization processes for catalytic reforming of naphtha, catalytic cracking, etc.

The partial oxidation (PDX) step and the step for purification of the synthesis gas obtained are described in general reference B cited above, pages 480-491 and 575-593.

The process of the invention generally comprises one or more steps for purification of synthesis gas, which are well known in the art, to eliminate residual sulphur-containing and nitrogen-containing compounds, in particular $H_2S$, HCN and also frequently $CO_2$.

$H_2S$ and $CO_2$ are conventionally separated by washing the gas with an aqueous solution of amines, for example monoethanolamine (MEA) or methyldiethanolamine (MDEA) as described in general reference B cited above, pages 468-471 or in reference work E: "Gas purification", $2^{nd}$ edition, F C Riesenfeld and A L Kohl, Gulf Publishing Company, Houston, pages 22 to 81.

One option which is occasionally used is to carry out on the synthesis gas, after condensing water, a conversion of the sulphur-containing compounds to $H_2S$, in particular on a chromium on alumina or copper/chromium on alumina catalyst as described on pages 626-627 of general reference E. It is also possible to use a shift conversion catalyst based on iron oxide and chromium oxide as described in that work on page 634. A final treatment on activated charcoal as described in that work on page 633 may finally be used downstream of the amine wash to remove residual traces of impurities.

If very high purity is desired, it is also possible to use, instead of washing with amines, purification with washing of the cooled methanol, for example using the Rectisol process which employs two stages to eliminate COS and $H_2S$ then $CO_2$, as described in general reference B cited above, pages 488 and 489 and in the general reference work E cited above, pages 691 to 700. Other options using molecular sieves (pressure swing adsorption, PSA) or catalytic conversion on zinc oxide may also be used during purification of synthesis gas.

Purification can typically eliminate almost all impurities, for example to less than 0.1 ppmv of sulphur, and similarly for nitrogen-containing compounds such as HCN.

In accordance with the invention, the Fischer-Tropsch conversion step may be carried out using any known process, using any known catalyst, in particular based on iron or cobalt, and is not limited to a particular process or a catalyst. It is carried out with a catalyst adapted to the $H_2$/CO ratio of synthesis gas, for example a cobalt catalyst for a synthesis gas with a $H_2$/CO ratio in the range about 1.8 to 2.5 or an iron catalyst for a synthesis gas with a $H_2$/CO ratio in the range about 1.2 to 2.

It is possible to use a three-phase fixed bed reactor or a three-phase slurry reactor, i.e. a three-phase reactor with a liquid phase comprising a divided solid catalyst in suspension and a gas phase (in this case the synthesis gas). The preferred option of the invention corresponds to such a three-phase reactor comprising a Fischer-Tropsch catalyst in the form of fine particles in suspension comprising an inert support impregnated with iron or cobalt. As an example, it is possible to use a support of alumina or silica or zirconia or silica-alumina or alumina-zirconia, impregnated with 10% to 30% by weight of iron or cobalt with respect to the overall catalyst. The three-phase mixture may comprise particles of catalyst with a mean diameter in the range 3 to 150 micrometers, preferably 10 to 120 micrometers, in suspension in a liquid essentially composed of reaction products, in particular paraffin waxes which are molten at the reaction temperature. The percentage by weight of catalyst may in general be in the range 10% to 40% by weight with respect to the liquid suspension/solid catalyst. The superficial gas flow rate in the reactor may be in the range 0.05 m/s to 0.4 m/s, in particular 0.12 to 0.3 m/s. The pressure is usually in the range 1.5 to 4 MPa, in particular 1.8 to 2.8 MPa. The temperature is often in the range 215° C. to 255° C., generally in the range 230° C. to 240° C. Further details concerning Fischer-Tropsch catalysts and/or processes can be found in the following patents or patent applications: EP-A-0 450 860; U.S. Pat. Nos. 5,961,933; 6,060,524; 6,921,778; PCT/FR05/02863.

BRIEF DESCRIPTION OF THE DRAWING

FIG. 1 shows a non-limiting example of a flow chart for a facility for carrying out the process of the invention, representing a preferred implementation of the invention.

DESCRIPTION OF FIG. 1 AND BEST MODE FOR CARRYING OUT THE INVENTION

A crude P, typically conventional (for example an oil which is transportable at ambient temperature, such as a light Arabian) is supplied via a line 1 to a desalter DES. The desalted oil supplies a preliminary distillation column PRE-DIST (often termed initial distillation or atmospheric distillation) via line 2, typically functioning at a pressure in the range 0.1 to 0.5 MPa. This column, which may optionally carry out summary fractionation, produces a light stream via a line 3a, typically comprising middle distillates; typically kerosene and diesel, as well as naphtha and lighter compounds.

The column also produces an atmospheric residue via a line 4, which supplies a vacuum distillation column VAC-DIST. This column, which typically functions at a pressure in the range 0.004 to 0.04 MPa, produces a stream of vacuum distillate VGO via a line 5 and a stream of vacuum residue VR via a line 6.

The vacuum residue VR is supplied to a solvent deasphalting unit (SDA) (typically using butane or, as is preferable, pentane) to produce a deasphalted oil DAO moving in line 7 and a stream of asphalt AS evacuated via a line 8.

The asphalt AS is mixed with a stream of diluent DIL supplied via a line 9. This stream comprises, for example, a stream of desalted oil supplied from line 2. DIL may also include light hydrocarbons removed from line 3.

Residue R1 comprising asphalt supplemented with diluent supplies the partial oxidation unit (PDX) via a line 8. This unit carries out partial oxidation with oxygen, at a pressure typically in the range 1 to 4 MPa, to produce a stream SG1 of synthesis gas with a ratio $H_2/CO$ typically in the range 0.4 to 0.8 and usually in the range 0.45 to 0.7.

These $H_2/CO$ ratios are very low and not suitable for Fischer-Tropsch synthesis, not only as regards cobalt catalysts but also as regards iron catalysts.

A steam reforming unit (SMR) is supplied via a line 11 with another feed G, typically different from oil P (external feed), comprising purified gas substantially free of $H_2S$ and supplemented with water vapour. This additional external feed (not from P) may in particular be natural or associated gas, in particular gas associated with oil P. G may also include recycled light fractions, for example C1/C2 which has been produced during the treatment of P, in particular during Fischer-Tropsch and/or hydrocracking steps, supplied via a line 17. Thus, by steam reforming, a second synthesis gas SG2 is produced, moving in line 12, with a $H_2/CO$ ratio of more than 3, for example in the range 4.5 to 7.

The two synthesis gases, SG1 moving in line 10 and SG2 moving in line 12, are mixed to form the synthesis gas SG which supplies, via line 13, the Fischer-Tropsch conversion unit (FT) which is generally preceded by a synthesis gas purification unit (PUR-FT) shown here as being integral with the Fischer-Tropsch unit. The synthesis gas is typically pre-purified to less than 0.1 ppmv (ppm volume) of sulphur-containing and nitrogen-containing impurities (and more particularly SG1, which contains more impurities, in particular $H_2S$ and traces of metals such as Ni, V which may also be purified upstream of the mixture). Washing may be carried out with ethanolamines, washing with methanol (for example using the Rectisol process or other processes which are known to the skilled person).

In accordance with the invention, adding a synthesis gas SG2 which is rich in hydrogen to the partial oxidation effluent SG1 produces, from external light hydrocarbons, typically C1-C4 and preferably C1/C2, can substantially increase the $H_2/CO$ ratio to a value compatible with the Fischer-Tropsch catalyst employed, for example to between 1.2 and 2 for an iron catalyst and between 1.8 and 2.5 or 2 to 2.3 for a cobalt catalyst.

The effluents from the Fischer-Tropsch step (FT) are fractionated into C1/C2 recycled to the steam reforming step via a line 15a, LPG (C3/C4) evacuated via a line 15b, naphtha evacuated via line 15c, and a fraction boiling above 150° C. comprising kerosene, gasoil and heavier products rich in waxes which are solid at ambient temperature. This stream supplies a hydrocracking unit (HDK) via a line 14. In addition to the Fischer-Tropsch products, the hydrocracking feed E1 comprises the vacuum distillate VGO and the deasphalted oil DAO respectively supplied via lines 5 and 7. The hydrocracking effluents are fractionated into C1/C2 recycled to the steam reforming step via line 16, LPG evacuated via a line 18b, kerosene evacuated via a line 18c, gasoil GO evacuated via a line 18d, naphtha and residual VGO. This residual VGO (vacuum gas oil) and naphtha are evacuated via line 18a and mixed in line 3b with light atmospheric distillation products. This can produce a synthetic oil (Syncrude) of very high quality, substantially free of asphaltenes and heavy sulphur-containing products. The products leaving the overall facility are thus completely free of sulphur-containing heavy fuel components.

The mixture of hydrogen-rich and hydrogen-poor synthesis gas can adapt the composition of the final synthesis gas to requirements, without having to carry out much steam conversion of CO (shift conversion: $CO+H_2O=CO_2+H_2$). CO conversion may be maintained, in particular to increase the flexibility or to adjust the $H_2/CO$ ratio, but its importance is limited.

EXAMPLES

Example 1 (Comparative)

A crude oil P was treated by atmospheric distillation then vacuum distillation, and finally conversion of the vacuum residue by partial oxygen oxidation (PDX). The synthesis gas obtained was partially converted by conversion of CO with steam (reaction: $CO+H_2O=CO_2+H_2$), to obtain a final $H_2/CO$ ratio of 2.15 which was suitable for FT synthesis on a cobalt catalyst. This method for converting residues by partial oxidation then partial conversion of CO to adjust the $H_2/CO$ ratio is known for transforming heavy residues or coal.

Tables 1 and 2 below derive from a simulation showing the various steps corresponding to vacuum residue conversion VR, before and after partial conversion of CO, and the final synthesis gas by Fischer-Tropsch synthesis then hydrocracking (HDK) the distillate and waxes obtained. The water necessary for partial conversion of co is supplied in two steps during cooling (quench) of the high temperature effluent from PDX, in the liquid and/or vapour end form to obtain a suitable temperature for said conversion.

TABLE 1

|  | POX feed | POX effluent | Quench on POX effluent | Quench inlet CO conversion | Effluent CO conv |
|---|---|---|---|---|---|
| Vacuum residue VR kg/h | 16000 |  |  |  |  |
| Oxygen | 17715 |  |  |  |  |
| $H_2O$ kg/h | 7300 |  | 10044 | 11557 |  |
| Pressure MPa |  | 3 |  |  |  |
| Temperature ° C. |  | 1400 |  | 25 |  |
| Flow rate kg/h | 41015 | 30590 |  |  | 62616 |
| $H_2$ vol % |  | 40.3 |  |  | 39.5 |
| CO vol % |  | 46.6 |  |  | 18.4 |

TABLE 1-continued

|  | POX feed | POX effluent | Quench on POX effluent | Quench inlet CO conversion | Effluent CO conv |
|---|---|---|---|---|---|
| $H_2O$ vol % |  | 9.8 |  |  | 27.2 |
| $CO_2$ vol % |  | 3.3 |  |  | 14.9 |
| C1 vol % |  | 0 |  |  | 0 |
| $H_2/CO$ vol |  | 0.86 |  |  | 2.15 |

TABLE 2

|  | F-T feed Purified | F-T effluent Overall | HDK feed (16) | Overall HDK effluent (18abcd) |
|---|---|---|---|---|
| Pressure MPa |  | 2.0 |  | 5 |
| Temperature ° C. |  | 50 |  | 50 |
| Flow rate kg/h | 23932 | 23932 | 4983 | 4983 |
| $H_2$ vol % | 66.3 |  |  |  |
| CO vol % | 30.8 |  |  |  |
| Light gases in effluent kg/h (CO, $H_2$, $CO_2$, C1, C2) |  | 6014 |  | 12.5 |
| $H_2$ kg/h |  |  | 10 |  |
| C3-C4 kg/h |  | 272 |  | 67.2 |
| Naphtha kg/h |  | 1796 |  | 621.7 |
| Distillates + waxes kg/h |  | 4973 | 4973 |  |
| Kerosene + gas oil kg/h |  |  |  | 4281.6 |
| Total final liquid products (C3-gas oil) kg/h |  |  |  | 4970.5 |
| Yield liquid wt %/feed |  |  |  | 31.06% |

Example 2

In Accordance with the Invention

The crude oil P of Example 1 was treated in the same way as regards fractionation and partial oxidation of the vacuum residue. However, no CO conversion was carried out, but rather external gas steam reforming, using a scheme similar to that of FIG. 1, but without deasphalting. The vacuum residue VR was sent directly to partial oxidation. The gas makeup (additional external feed) for steam cracking was a methane makeup. Tables 3, 4 and 5 below, deriving from a simulation, show the results of the various steps corresponding to conversion of the VR residue, the steam reforming step (SMR), and the final synthesis gas conversion (mixture of synthesis gas from partial oxidation and from steam reforming (SMR)) by Fischer-Tropsch synthesis then hydrocracking (HDK) of distillate and the waxes obtained. It can be seen that the yield of liquid products (C3, C4, naphtha, kerosene and gas oil) is substantially improved in the invention as it changed from 31.06% to 37.75% of the overall hydrocarbon feed (feed and fuel). In this simulation, the steam reforming, SMR, energy consumption is self sufficient. A further increased yield of liquid products would be obtained if thermal recovery on the high temperature effluent from partial oxidation were included to generate the steam necessary for steam reforming.

The scope of the invention encompasses using a different thermal integration or technical arrangements or particular process arrangements which are already known to the skilled person.

TABLE 3

|  | POX feed (8) | POX effluent (10) |
|---|---|---|
| Vacuum residue VR kg/h | 16000 |  |
| Oxygen | 17715 |  |
| $H_2O$ kg/h | 7300 |  |
| Pressure MPa |  | 3 |
| Temperature ° C. |  | 1400 |
| Flow rate kg/h | 41015 | 30590 |
| $H_2$ vol % |  | 40.3 |
| CO vol % |  | 46.6 |
| $H_2O$ vol % |  | 9.8 |
| $CO_2$ vol % |  | 3.3 |
| C1 vol % |  | 0 |
| $H_2/CO$ vol |  | 0.86 |

TABLE 4

|  | SMR feed (11) | SMR effluent (12) | SMR fuel (no reference) |
|---|---|---|---|
| C1 (additional external feed) | 12000 |  | 1470 |
| Light gas ex FT kg/h (CO, $H_2$, $CO_2$, C1, C2) | 0 |  | 11591 |
| Light gas ex HDK kg/h | 0 |  | 28 |
| $H_2O$ kg/h | 53902 |  |  |
| Pressure MPa |  | 2.6 |  |
| Temperature ° C. |  | 850 |  |
| Flow rate kg/h | 65902 | 65902 |  |
| $H_2$ vol % |  | 44.3 |  |
| CO vol % |  | 7.2 |  |
| $H_2O$ vol % |  | 40.9 |  |
| $CO_2$ vol % |  | 5.6 |  |
| C1 vol % |  | 2 |  |
| $H_2/CO$ vol |  | 6.15 |  |

TABLE 5

|  | F-T feed | F-T effluent | HDK feed | HDK effluent |
|---|---|---|---|---|
| Pressure MPa |  | 2.0 |  | 5 |
| Temperature ° C. |  | 50 |  | 50 |
| Flow rate kg/h | 51498 | 51498 | 11153.3 | 11153.3 |
| $H_2$ Vol % (FT feed) | 66 |  |  |  |
| CO vol % (FT feed) | 30.7 |  |  |  |
| Light gases in effluent kg/h (CO, $H_2$, $CO_2$, C1, C2) |  | 11591 |  | 28 |
| $H_2$ kg/h |  |  | 22.3 |  |
| C3-C4 kg/h |  | 648 |  | 150 |
| Naphtha kg/h |  | 3791 |  | 1391.3 |
| Distillates + waxes kg/h |  | 11131 | 11131 |  |
| Kerosene + gas oil kg/h |  |  |  | 9584 |

TABLE 5-continued

| | F-T feed | F-T effluent | HDK feed | HDK effluent |
|---|---|---|---|---|
| Total final liquid products (C3-gas oil) kg/h | | | | 11125.3 |
| Yield liquid wt %/overall feed | | | | 37.75% |

The invention claimed is:

1. A process for transforming at least one crude oil P, comprising;
   a preliminary treatment of P, comprising fractionating P by distillation (PRE-DIST) and/or deasphalting (SDA) to produce asphalt AS and at least one first non-asphaltenic stream E1 boiling essentially above 340° C.;
   partially oxidizing (POX) the asphalt AS supplemented with 4% to 40% by weight of desalted oil P to produce a first synthesis gas SG1 with a $H_2$/CO ratio of less than 1;
   steam reforming a cut G comprising hydrocarbons containing less than 5 carbon atoms, said hydrocarbons comprising C1-C4 fractions recycled from a Fischer-Tropsch conversion step and a hydrocracking step, wherein at least 50% by weight of said hydrocarbons are external to the crude oil P, to produce a second synthesis gas SG2 with a $H_2$/CO ratio of more than 3;
   mixing at least a portion of SG1 and at least a portion of SG2 in a proportion which can produce a synthesis gas SG with a $H_2$/CO ratio in the range 1.2 to 2.5;
   Fischer-Tropsch converting SG, generally purified by preliminary purification (PUR-FT), to obtain principally liquid fractions and paraffin waxes;
   hydrocracking (HDK) at least the major portion of said paraffin waxes to produce at least one cut comprising liquid hydrocarbons boiling below 340° C., which hydrocracking is carried out on at least the majority of the paraffin waxes mixed with E1;
   and producing at least one pre-refined non-asphaltenic oil Pa from at least a portion of the non-asphaltenic cuts derived from the preliminary treatment of P, optionally after catalytic hydrogenating treatment(s), and from at least a portion of the hydrocracking effluents.

2. A process according to claim 1, in which E1 is essentially constituted by vacuum distillate VGO and/or deasphalted oil DAO.

3. A process according to claim 1, in which hydrogen used for hydrocracking is produced from a fraction of the steam reforming effluents.

* * * * *

UNITED STATES PATENT AND TRADEMARK OFFICE
CERTIFICATE OF CORRECTION

PATENT NO. : 8,431,013 B2
APPLICATION NO. : 12/376522
DATED : April 30, 2013
INVENTOR(S) : Rojey et al.

It is certified that error appears in the above-identified patent and that said Letters Patent is hereby corrected as shown below:

In the Claims
Column 15, line 16 reads "produce asphalt AS and at least one first non-asphaltenie" should read
-- produce asphalt AS and at least one first non-asphaltenic --

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,431,013 B2                                    Page 1 of 1
APPLICATION NO. : 12/376522
DATED             : April 30, 2013
INVENTOR(S)       : Rojey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1087 days.

Signed and Sealed this
Eighth Day of September, 2015

Michelle K. Lee
*Director of the United States Patent and Trademark Office*